United States Patent
Hecker et al.

(10) Patent No.: US 7,865,080 B2
(45) Date of Patent: Jan. 4, 2011

(54) METHODS FOR THE OPTICAL TRANSMISSION OF POLARIZATION MULTIPLEX SIGNALS

(75) Inventors: Nancy Hecker, Innsbruck (AT); Werner Paetsch, München (DE); Dirk van den Borne, BN Bladel (NL)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 564 days.

(21) Appl. No.: 11/883,099

(22) PCT Filed: Jan. 25, 2006

(86) PCT No.: PCT/EP2006/050429

§ 371 (c)(1),
(2), (4) Date: Jul. 26, 2007

(87) PCT Pub. No.: WO2006/079634

PCT Pub. Date: Aug. 3, 2006

(65) Prior Publication Data
US 2008/0145052 A1 Jun. 19, 2008

(30) Foreign Application Priority Data
Jan. 26, 2005 (DE) ................. 10 2005 003 679
Jan. 26, 2005 (DE) ................. 10 2005 003 681

(51) Int. Cl.
*H04J 14/06* (2006.01)
*H04J 14/00* (2006.01)
*H04J 14/04* (2006.01)
*H04J 14/02* (2006.01)
*H04J 11/00* (2006.01)
*G02B 6/28* (2006.01)
*G01C 19/72* (2006.01)

(52) U.S. Cl. ............... 398/65; 398/184; 398/152; 398/205; 398/79; 359/122; 359/156

(58) Field of Classification Search ............... 398/65, 398/184
See application file for complete search history.

(56) References Cited

U.S. PATENT DOCUMENTS 5,111,322 A * 5/1992 Bergano et al. ............... 398/74

(Continued)

FOREIGN PATENT DOCUMENTS

JP         2000209187 A  *  7/2000

(Continued)

OTHER PUBLICATIONS

English Translation of Satoshi.*

(Continued)

*Primary Examiner*—Ken N Vanderpuye
*Assistant Examiner*—Oommen Jacob
(74) *Attorney, Agent, or Firm*—Laurence A. Greenberg; Werner H. Stemer; Ralph E. Locher (57) ABSTRACT

In order to reduce mutual interferences between POLMUX and signals, the signals are transmitted with differed to each other carrying signals, thereby making it possible to obtain the circular polarization of each resulting POLMUX signal. Each second POLMUX signal is transmissible with an opposite circular polarization. In order to reduce also interferences when only one modulated data signal is transmitted through a POLMUX channel, a polarization plane of modulated data signals of each second POLMUX channel is turned at 45°. In a variant, polarization multiplex signals are produces and the resulting polarizations thereof in adjacent channels are perpendicular to each other.

8 Claims, 7 Drawing Sheets

U.S. PATENT DOCUMENTS

| | | | | |
|---|---|---|---|---|
| 6,359,664 | B1* | 3/2002 | Faris | 349/15 |
| 6,714,742 | B1* | 3/2004 | Hayee et al. | 398/65 |
| 6,850,712 | B1* | 2/2005 | Delavaux et al. | 398/201 |
| 7,035,009 | B1* | 4/2006 | Kelly et al. | 359/484 |
| 7,076,169 | B2* | 7/2006 | Shpantzer et al. | 398/76 |
| 7,280,764 | B2* | 10/2007 | Nishimura et al. | 398/152 |
| 7,343,100 | B2* | 3/2008 | Yao | 398/152 |
| 2002/0003813 | A1* | 1/2002 | Marko | 370/477 |
| 2002/0067883 | A1* | 6/2002 | Lo | 385/24 |
| 2002/0186435 | A1* | 12/2002 | Shpantzer et al. | 359/136 |
| 2003/0063353 | A1* | 4/2003 | Hamoir | 359/181 |
| 2003/0090768 | A1 | 5/2003 | Liu et al. | |
| 2003/0118183 | A1* | 6/2003 | Struyk | 380/213 |
| 2003/0128982 | A1* | 7/2003 | Glingener | 398/65 |
| 2003/0194237 | A1* | 10/2003 | Farries et al. | 398/102 |
| 2003/0206676 | A1* | 11/2003 | Ovadia et al. | 385/11 |
| 2005/0199787 | A1* | 9/2005 | Zhang et al. | 250/225 |
| 2005/0270541 | A1* | 12/2005 | Islam et al. | 356/460 |
| 2005/0286904 | A1* | 12/2005 | Calabro et al. | 398/152 |
| 2006/0018204 | A1* | 1/2006 | Lee et al. | 369/13.29 |

FOREIGN PATENT DOCUMENTS

| | | |
|---|---|---|
| WO | WO 00/72492 A1 | 11/2000 |
| WO | WO 2004/028046 A1 | 4/2004 |

OTHER PUBLICATIONS

Y. Hashizume et all., "50 GHZ-Spaced 64 Channel Integrated Polarization-Interleave-Multiple Xer on Silica-Based Planar Lightwave Circuit", Technical Digest, Optoelectronics and Communications Conference, Proceedings of OECC, vol. 1, Jul. 8, 2002, pp. 452-453, XP009039145.

Y. Frignac et al., "Transmission of 256 wavelength-division and polarization-division-multiplexed channels at 42.7Gb/s (10.2Tb/s capacity) over 3/spl times/100km of TeraLight/spl trade/ fiber", Optical Fiber Communication Conference and Exhibit, 2002, OFC 2002, Mar. 17-22, 2002, Abstract.

* cited by examiner

METHODS FOR THE OPTICAL TRANSMISSION OF POLARIZATION MULTIPLEX SIGNALS

CROSS REFERENCE TO RELATED APPLICATIONS

This application is the US National Stage of International Application No. PCT/EP2006/050429, filed Jan. 25, 2006 and claims the benefit thereof. The International Application claims the benefits of German application No. 102005003679.1 DE filed Jan. 26, 2005 and German application No. 102005003681.3 DE filed Jan. 26, 2005, all of the applications are incorporated by reference herein in their entirety.

FIELD OF INVENTION

The invention relates to methods for the transmission of polarization multiplex signals combined to form a wavelength division multiplex signal.

BACKGROUND OF THE INVENTION

The transmission of data in transmission systems with multiplex technology allows a plurality of users to use a transmission medium simultaneously, thereby significantly extending transmission capacity. With the optical wavelength division multiplexing method (abbreviated to WDM) N modulated optical signals in NRZ format (hereafter also referred to as data signals) with the mid-wavelengths (carrier wavelengths) $\lambda_1, \ldots, \lambda_N$ are combined by a wavelength multiplexer to form a broadband optical WDM signal and transmitted in N channels. The WDM signal is therefore a summated signal consisting of the data signals of the N signals. A wavelength range or frequency range used for the transmission of a data signal is used as the channel.

The polarization multiplexing method is used to double transmission capacity in a predetermined optical transmission channel. With the polarization multiplexing method (abbreviated to POLMUX) two data signals polarized orthogonally in respect of each other are transmitted in an optical channel at a mid-wavelength. The resulting signal is referred to as a polarization multiplex or POLMUX signal. This doubles the transmission capacity of an individual transmission channel. An advantageous method for POLMUX transmission is disclosed in an earlier application with the publication number 10 2004 005718 A1.

By combining both transmission technologies it has been possible to achieve data rates of more than 10 Tbit/s over a distance of more than 300 km (Y. Frignac et al., "Transmission of 256 WDM and polarization division multiplexed channels at 42.7 Gb/s (10.2 Tb/s capacity) over 300 km of TeraLight™ fiber", in Proc. OFC 2002, Paper FC5).

SUMMARY OF INVENTION

However the data transmission ranges in transmission systems with polarization multiplexing are seriously restricted by non-linear interference effects. These are essentially polarization mode dispersion (PMD) and non-linear, bit-pattern-dependent crosstalk effects. While bit-pattern-dependent crosstalk due to stimulated Raman scatter (SRS), cross-phase modulation (XPM) and four-wave mixing (FWM) is known from WDM systems without POLMUX, polarization-dependent crosstalk occurs predominantly in systems with POLMUX.

The polarization state of a transverse electromagnetic wave is defined by the vector components of the amplitude of the electric field in relation to a random but fixed rectangular coordinate system and the relative phase between the vector components of the electric field. A change in the relative phase between the components therefore brings about a change in the polarization state of the optical wave. In multichannel systems therefore non-linear effects, which produce a change in the relative phase, also bring about a mutual change in the polarization state of the optical signals. The cross-phase modulation (XPM), which is a function of the polarization state and intensity of the signals involved, therefore generally brings about a change in the relative phase and thus a change in the polarization state. Its pattern over time is a function of the transmitted bit sequence of the co-propagated channels.

In a channel of a WDM system with POLMUX the constantly alternating bit sequences of the data signals in a POLMUX signal that are polarized orthogonally in respect of each other cause the resulting polarization to change as a function of time. If the polarization states of the resultants for two or more channels correspond in a time interval (for example if the same bit combination is transmitted in all the channels under consideration in both polarizations), XPM causes the intensity in one channel to bring about a polarization change in all the other channels. Because of the constantly alternating bit sequences this results in a noise-type change in the polarization state of each individual POLMUX signal, which is identical to depolarization. This POLMUX-specific depolarization effect, the cause of which lies in XPM, is referred to hereafter as cross-polarization modulation (XPolM). As a result of XPolM the polarizations of the data signals, which were originally polarized orthogonally in respect of each other, are no longer perpendicular to each other after transmission and cannot be separated uniquely in the receiver. The crosstalk caused by XPolM is in principle independent of the data rate and is only dependent to a minor degree on channel spacing. Rather XPolM is a function of the total output in all channels and the number of channels. In WDM systems with POLMUX and a plurality of channels the influence of XPolM predominates compared with XPM.

The interference effects caused by XPolM can be reduced by lesser total outputs in the individual transmission links. This can be achieved either by shortening the link sections or reducing the number of channels. Another option for slightly reducing XPolM is to use Raman amplifiers, as the integrated output over the link is then reduced. It is nevertheless true that a reduction of the total output in a WDM system is associated with other losses of function and only reduces the influence of XPolM on data transmission to a limited extent.

New options are therefore being sought for reducing mutual interference during the transmission of WDM-POLMUX signals.

This object is achieved by the methods described in the independent claims.

To reduce the mutual interference of POLMUX signals in channels of a WDM system, it is advantageous that the polarization multiplex signals are formed respectively from two data signals with a phase shift of 90° in respect of each other.

The invention is based on the knowledge that mutual interference between the POLMUX signals is greatest when POLMUX signals or optical data signals of the same polarization are transmitted in the channels. The signals transmitted in a channel form a resulting signal (resulting E-field vector), which lies in one plane in the case of a linear polarization and is particularly disruptive, if the disrupted signal has the same polarization plane. If resulting POLMUX signals are transmitted, which have a resulting circular polarization, these POLMUX signals (E-field vectors) then rotate in adjacent channels at different speeds due to the different wavelength, so there is a reduction from a maximum to a mean disruptive influence.

The mutual influence is further reduced if adjacent channels have (in this instance circular) polarizations that are orthogonal in respect of each other.

Only if both optical data signals in a POLMUX channel simultaneously have an active signal (generally the logical 1 of the binary data signal), is there a resulting POLMUX signal with a different polarization from the individual modulated data signals. In the case of transmission of only one active modulated data signal respectively in a channel—the other modulated data signal corresponds to the logical zero, at which the carrier signal is suppressed—if no further measures were taken, there would be a strong mutual influence, if the modulated data signals of the other channels had the same polarization. This is advantageously prevented by rotating the polarization planes of the modulated data signals in every second channel through 45°. This reduces the "worst case" interference. However there is rather stronger mutual interference than in the optimum instance, in which the original modulated signals of adjacent channels were polarized orthogonally in respect of each other; however a reduction in the disruptive influence in worst case instances is more important.

It is also advantageous that in a first channel a first optical data signal and a second optical data signal without a phase difference between their carrier signals are combined to form a polarization multiplex signal and that in a second channel the carrier signal of a second optical data signal is phase-shifted by 180° in respect of the carrier signal of its first optical data signal and combined with a first optical data signal to form a second polarization multiplex signal, so that if both optical data signals respectively are emitted simultaneously, a resulting polarization of the second polarization multiplex signal of the second channel differs by 90° from the resulting polarization of the first polarization multiplex signal of the first channel.

Interference due to XPolM has a particularly serious impact if all the optical signals have the same polarization and logical 1s are transmitted in a large number of channels. However if the resulting polarization of a polarization multiplex signal of a channel differs by 90° in respect of that of a respectively adjacent polarization multiplex signal, the above-mentioned instance is avoided and the interference is reduced. The method therefore advantageously means an increase in transmission range. Non-linear crosstalk is reduced in any case with other bit combinations of the optical signals, for which the polarizations of the data signals of respectively adjacent channels are orthogonal in respect of each other.

A further advantage results if the setting of the phases of the modulated optical signals in relation to each other is regulated. This opens up the possibility of regulating the difference in the resulting polarization of the POLMUX signals on the transmit side in such a manner, until a minimum is set on the receive side, for example when examining the eye diagrams with regard to the "eye opening penalty" (EOP), and therefore a measurable improvement occurs in transmission quality.

Polarization of the POLMUX signals is advantageously controlled by branching a regulating signal. This results in optimum interference reduction.

In one variant of the method the polarization state of the POLMUX signals is advantageously monitored and regulated at at least one point in the transmission link during data transmission.

Further advantageous developments are set out in the dependent claims.

BRIEF DESCRIPTION OF THE DRAWINGS

The invention is described in more detail below with reference to exemplary embodiments.

DETAILED DESCRIPTION OF INVENTION

FIG. 1 shows the polarization and phase relationship of two POLMUX signals in adjacent POLMUX channels K1 and K2. The invention is to be described with reference to two adjacent channels, with the same resulting for further channels. Two optical data signals modulated with the logical 1 PS1x and PS1y are transmitted in the first POLMUX channel K1. The snapshot shows the amplitudes of the E-field vectors. The transmission direction in one fiber is perpendicular to the plane of the drawing. The amplitude-modulated data signal PS1x is polarized horizontally here and the amplitude-modulated data signal PS1y is polarized vertically. Both signals also have a mutual phase shift of ±90° between their optical carrier signals (in this instance PS1x −90° for example, FIG. 1b), so that a resulting POLMUX signal PMS1 has a right-hand circular polarization (dashed). The POLMUX signals in further channels of the WDM system are also polarized in a circular manner; as they have different wavelengths however, the resulting fields also rotate at different rotation speeds, resulting in a mean disruptive influence.

Figure 1A:
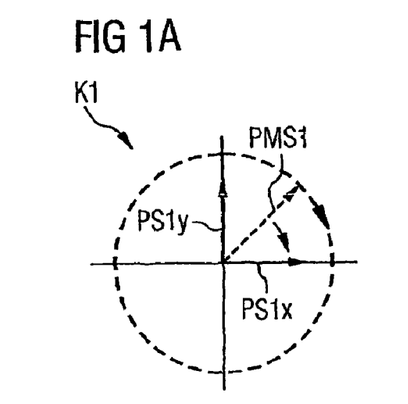
FIG. 1 shows polarization and phases of a POLMUX signal.
Figure 1B:
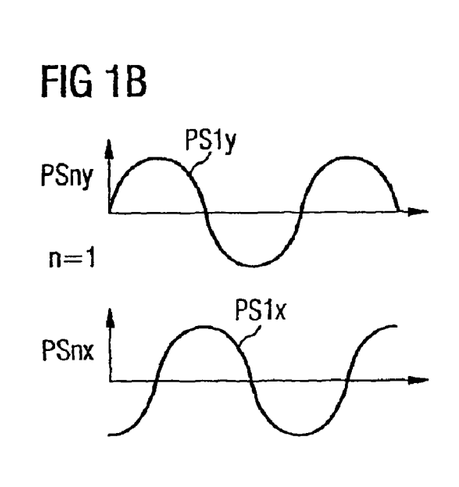
Figure 1C:
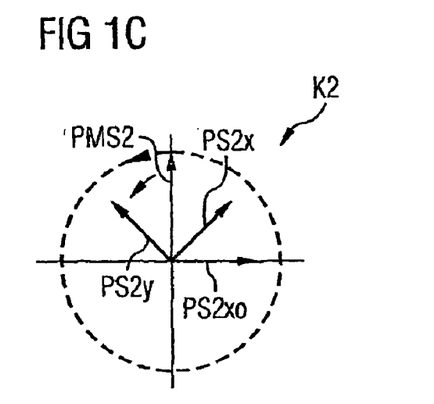
Figure 1D:
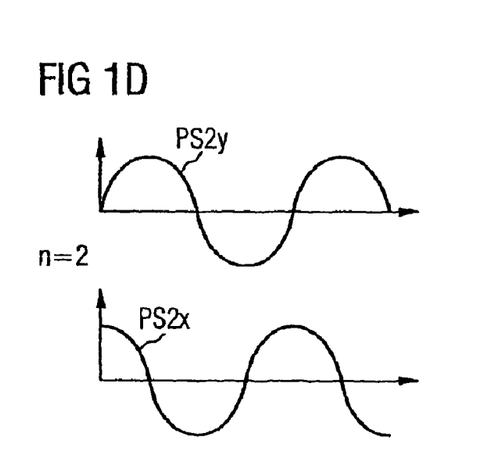

In FIG. 1c the adjacent or, in the case of a wavelength division multiplex signal having more than two POLMUX signals, every second POLMUX signal has circular polarization in a counter direction. This is achieved in that a phase shift in a direction counter to the modulated data signals PS1x and PS1y of the first channel (in this instance PA2x +90°, FIG. 1d) is set between the two modulated signals PS2x and PS2y. A resulting POLMUX signal PMS2 with counter left-hand circular polarization then results in the second channel K2. The resulting E-fields thus rotate in a counter direction and have a minimal mutual influence. In a WDM system it would be expedient for the odd-number POLMUX signals n=1, 3, 5, . . . to be polarized like PMS1 and all the even-number POLMUX signals n=2, 4, 6, . . . to be polarized like PMS2.

However if no further measures were taken, a maximum mutual influence would again result, during transmission of just one modulated data signal respectively per channel, for example PS1x and PS2x, between said signals. Rotating the polarization plane of the modulated data signals PS2x and PS2y in the second channel results in a difference in the polarization plane of respectively 45° in respect of the modulated data signals of the first channel, thereby reducing mutual interference.

Figure 2:
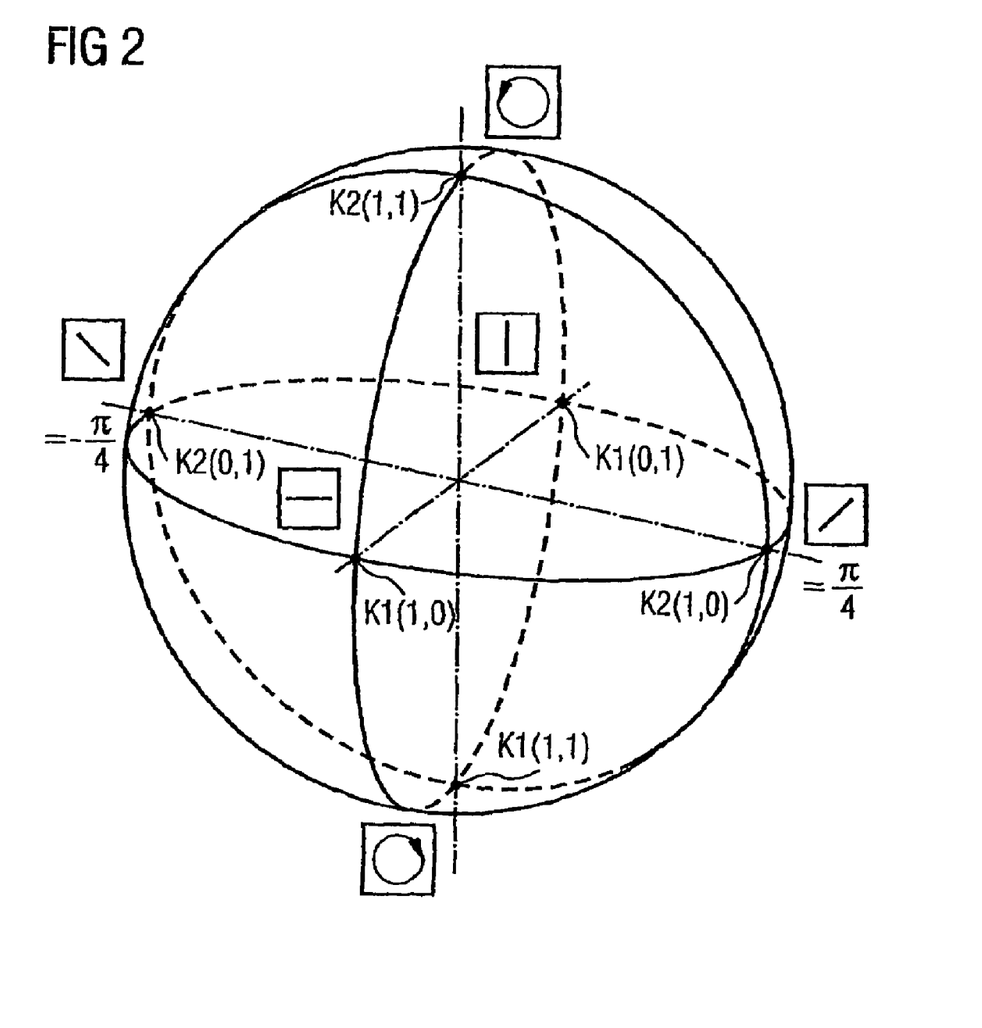
FIG. 2 shows a representation of the polarizations on a Poincaré sphere.

FIG. 2 shows the polarization of the modulated data signals (or their carrier signals) on the Poincaré sphere and the resulting polarization during the transmission of two logical ones in the channel K1. If only the signal PS1x (bits 1,0 in the POLMUX channel) is transmitted, it has a horizontal polarization (in the foreground); if only the modulated data signal PS1y (0,1) is transmitted, it has a vertical polarization (in the background of the Poincaré sphere). These two signals are orthogonal in respect of each other and therefore only influence each other to a minimal degree. If both modulated data signals (1,1) are transmitted, the resulting POLMUX signal (1,1) has a right-hand circular polarization (south pole). When only one modulated optical data signal PS2x or PS2y (bits 1,0 or 0,1) is transmitted, a polarization angle θ=+45° results in the POLMUX channel K2; on the Poincaré sphere this corresponds respectively to a polarization differing by π/4 (90° with the conventional graduation) in respect of the individual modulated data signals PS1x and PS1y of the channel K1. If both modulated data signals (1,1; 1,1) are transmitted respectively in both channels K1 and K2, these are polarized in a circular manner orthogonally in respect of each other. Even when two modulated optical data signals are transmitted in the channel K1 and only one data signal in the channel K1, different polarizations result. Therefore at least differences of 90° on the Poincaré sphere can be seen between any modulated data signals of the channels K1 and K2. In principle it is possible to maintain the same relationships by rotating in any direction on the Poincaré sphere but a technical solution is very problematic.

Figure 3:
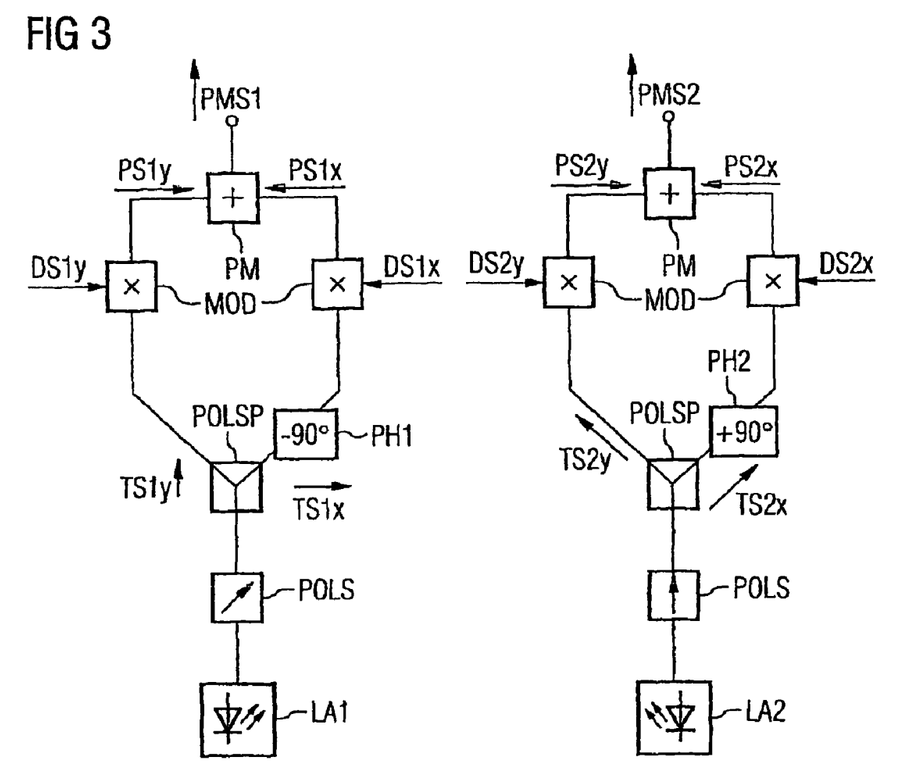
FIG. 3 shows an outline of an arrangement for generating POLMUX signals with different circular and linear polarizations.

FIG. 3 shows two basic arrangements for generating the required signals. A laser LA1 generates a signal with linear polarization, which has a polarization plane of 45° (in some instances due to a polarization setter POLS). This signal is split by a pole splitter POLSP into a horizontally polarized carrier signal TS1x and a vertically polarized carrier signal TS1y. Both signals are modulated respectively with a data signal DS1x or DS1y and combined in a polarization multiplexer PM to form the POLMUX signal PMS1. A phase shift is achieved by a first phase shifter PH1, which in this instance symbolically brings about a phase shift of the carrier signal TS1x through −90° (in some instances PH is inserted into the signal path of the signal TS1y).

The second POLMUX signal PMS2 is generated in a corresponding manner. A second laser diode LA2 generates a signal with a different wavelength, whose polarization is optionally oriented vertically in a polarization setter POLS. The subsequent polarization splitter POLSP splits the laser signal into two mutually orthogonal carrier signals TS2x and TS2y, which are rotated respectively through 45° in respect of the carrier signals of the first channel. As a result the interference during transmission of just one of the data signals due to crosstalk is never minimal but is always reduced. With a larger number of channels the polarizations of the data signals can also be rotated through correspondingly smaller values, since the interference effects are then averaged. Additional rotations through a multiple of 90° give the same result. This time the carrier signal TS2x is phase-shifted through +90° by a second phase shifter PH2 in respect of the other carrier signal TS2y. Both carrier signals are modulated with data signals DS2x and respectively DS2y and combined in the polarization multiplexer PM to form the second POLMUX signal PMS2, which has a counter circular polarization to the first POLMUX signal PMS1, when both carrier signals (1,1) are transmitted. The polarization and optionally also the phase shift are kept constant by means of regulation.

The method can be supplemented with additional measures, which reduce any mutual influencing of the POLMUX signals. For example the modulated data signals can be delayed in respect of each other by an integral multiple of a bit length during transmission, to bring about decorrelation between the POLMUX signals.

The basic diagram in FIG. 4 is intended to illustrate the difference between conventional POLMUX transmission and the inventive variant for preventing crosstalk due to XPolM. The resulting E-field vectors for the possible bit constellations of the two data signals of a POLMUX signal are shown for one time for two channels K1 and K2 with different wavelengths.

Figure 4A:
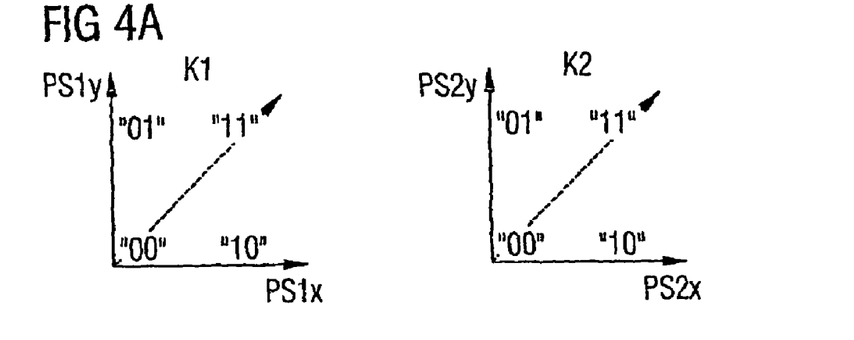
FIG. 4 shows a basic diagram to illustrate polarization during a POLMUX transmission.
Figure 4B:
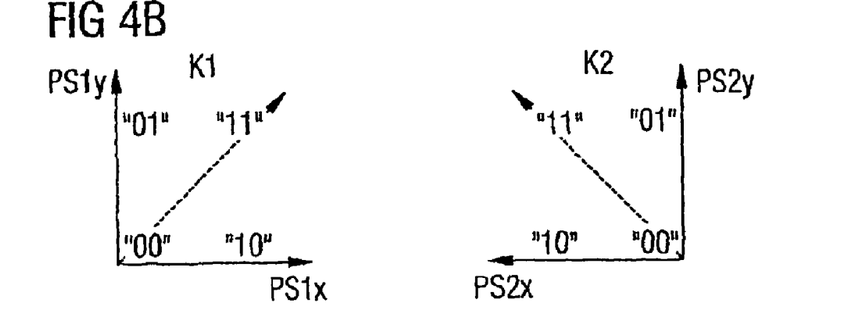

FIG. 4a represents the case of conventional POLMUX transmission, with two modulated optical data signals PS1x and PS1y respectively, which are polarized orthogonally in respect of each other, being transmitted in one channel respectively (in this instance K1 or K2) at the associated wavelength. The resulting polarization of the POLMUX signal is a function of the transmitted bit pattern. In instances where only one data signal (a logical 1), which is polarized either horizontally or vertically, is transmitted (bit combinations ,10' and ,01'), the E-field vector of the resulting polarization of the POLMUX signal is plotted in the x or y direction. If two logical ones are transmitted simultaneously in both planes as data signals, the E-field vector of the resulting polarization of the POLMUX signal is at 45° to the x direction (bit combination ,11'). The inventive method changes the polarization state of the resultant for the POLMUX signal for every second channel, as shown in FIG. 4b. In every second channel the phase of the first modulated data signal PS2x is shifted through 180°, as can be seen from the E-field vectors for the channel K2. For the combination '10' the E-field vector points in the negative x direction. If a 1 is transmitted in both channels, the E-field vector of the resulting polarization of the POLMUX signal is at 135° to the x direction, in other words the resulting polarization in channel K2 differs by 90° from the resulting polarization in channel K1. The type of polarization is immaterial for the inventive method. The same generally also applies to optical signals with linear polarization or circular or elliptical polarization.

Figure 5:
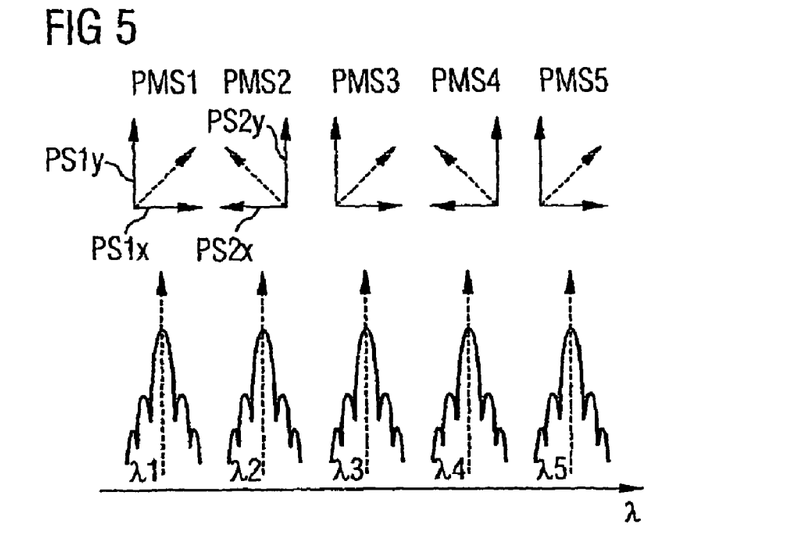
FIG. 5 shows a basic diagram to illustrate the principles of a polarization-interleaved WDM system.

FIG. 5 outlines the spectra of the POLMUX signals made up respectively of two data signals for 5 channels λ1-λ5 of a WDM system with increasing wavelength λ (with the designation λ1-λ5 at the same time indicating the different wavelengths of the carrier signals CW). Shown above each POLMUX signal PMS1-PMS5 are the E-field vectors of the resulting polarizations of the individual POLMUX signals for the possible bit combinations, as in FIG. 1. In the case of 11 combinations of both data signals PSnx and PSny (n=1, 2, 3, . . . ) respectively in respectively adjacent channels, mutually orthogonal polarizations of the resulting POLMUX signals result. A non-linear coupling between channels with the same bit pattern is reduced due to the different polarization states of the adjacent channels. Since the bit sequences in the individual channels alternate constantly, the interference due to crosstalk cannot be eliminated totally. Nevertheless the system performance in a WDM system with POLUMX and the inventive so-called interleaved polarization is always better, as the crosstalk due to XPolM is the effect having the greatest adverse effect on system performance.

Figure 6:
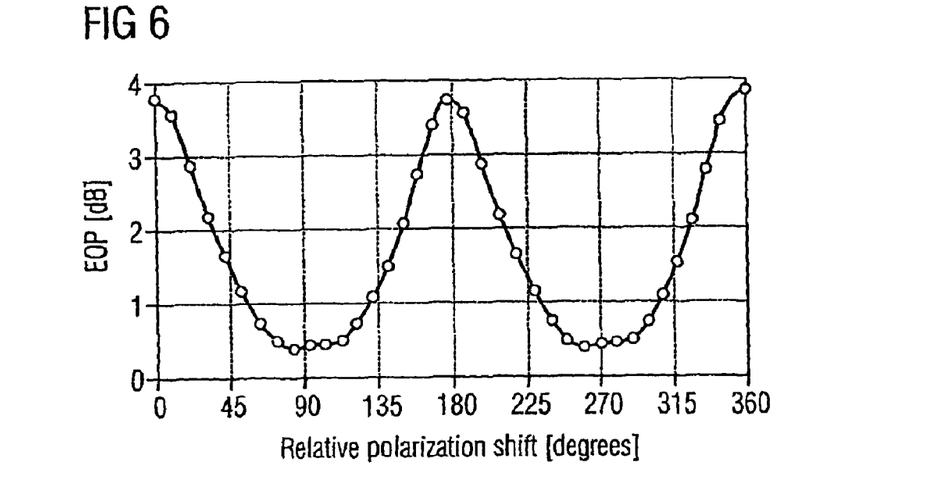
FIG. 6 shows the pattern of the eye opening penalty EOP as a function of polarization difference between the resultants of 5 POLMUX signals.

The improvement of transmission characteristics in WDM systems with POLMUX and interleaved polarization has been confirmed both by simulation and by experiment. In theoretical considerations the change in polarization of an optical signal in the propagation direction has been calculated based on the Manakov equation in a WDM system with a plurality of channels. FIG. 6 refers to such a simulation result. In a 2×10 Gbit/s WDM system with 5 channels and POLMUX the eye opening penalty (EOP) at the receiver is plotted in the y direction. It is defined as twice the mean intensity divided by the maximum eye opening of an eye diagram for 20% of the bit period and is given in dB. Qualitatively speaking the EOP is a measure of the eye opening of an eye diagram. With an EOP value of 3 dB the eye is up to half closed and the ratio of interference effects is very high. The relative polarization difference of the resulting polarizations of the POLMUX signals in respectively adjacent channels is shown on the x-axis in FIG. 3. 7.8 dB output was assumed per channel. The EOP minima for the x values of 90° and 270° can be clearly identified. At these points the E-field vectors of the resulting polarizations of the POLMUX signals for respectively adjacent channels are approximately orthogonal in respect of each other. This shows that for interleaved polarizations of the POLMUX signals in adjacent channels the opening of an eye diagram on the receive side is only influenced to a minor degree by XPolM and that the interference due to XPolM is reduced to a maximum degree by the inventive method.

In principle the following preconditions for the technical realization of the inventive method should be noted: To generate a POLMUX signal with two data signals an individual laser source is essential, as fixed phase differences between the data signals can only be set in this manner. The setting of exact polarization states at the start of the transmission link should be carried out with great care. It is important that the reference polarization planes are identical for all channels. The efficiency of the method will be a function of whether the 90° difference in the polarization of the resultants for the POLMUX signals is maintained in respectively adjacent channels. The use of polarization-maintaining fibers or multiplexers is therefore advantageous, as is the presence of regulating circuits and monitoring mechanisms for the polarization states. The use of. polarization-maintaining arrayed waveguide gratings (AWGs) for generating POLMUX signals with interleaved polarization in a WDM system has the advantage that no monitoring units are required within the multiplex arrangement. The arrangement can also be inserted easily into an already existing POLMUX transmission link. Also the bit sequences transmitted in all the channels have to be time-synchronized to achieve maximum interaction times.

Figure 7:
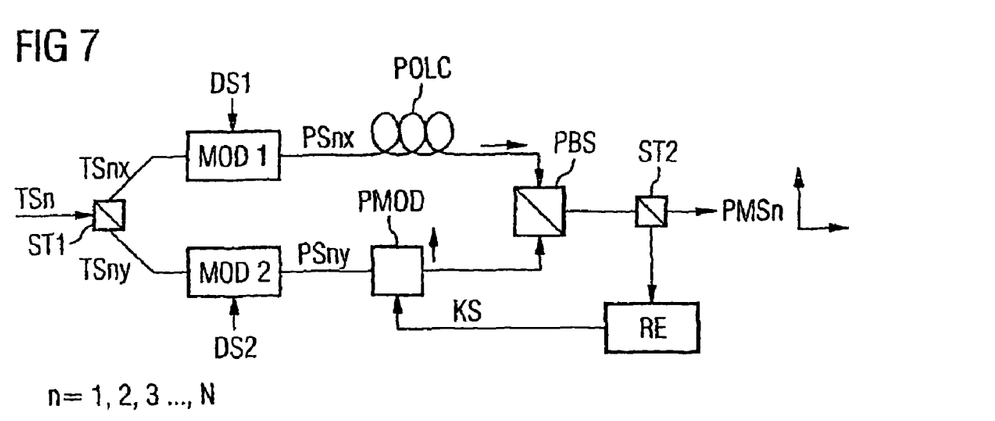
FIG. 7 shows the basic circuit diagram of a POLMUX transmit arrangement with regulating facility for monitoring the polarization state.

FIG. 7 shows the basic circuit diagram of a transmit-side POLMUX arrangement with a regulating facility for the polarization state. A continuous optical carrier signal TSn (n=1, 2, 3, ...) of a predetermined emission wavelength of a laser is supplied to a beam splitter ST1, which splits it into two CW sub-signals TSnx and TSny of the same amplitude, which serve as carrier signals for the individual channels with n=1, 2, 3, .... The arrangement for generating a POLMUX signal PMSn for any channel n is described below. The first CW sub-signal/carrier signal TSnx is supplied to a first modulator MOD1, where it is amplitude-modulated with a first data signal DS1. The amplitude-modulated optical signal PSnx emitted at the output of the modulator MOD1 is supplied to a polarization combiner PBS by way of a polarization control element POLC, which adjusts the polarization by 90°. The second CW sub-signal/carrier signal TSny is supplied to a second modulator MOD2, where it is amplitude-modulated with a second data signal DS2. The amplitude-modulated optical data signal PSny emitted at the output of the modulator is supplied to a phase modulator PMOD, which is controlled by a regulating facility RE. In the phase modulator PMOD it is possible to set a phase shift of 180° in respect of the optical data signal PSnx. A phase shift of 180° brings about a polarization rotation of the resulting POLMUX signal through 90°. The optical data signal PSny is then supplied to the polarization combiner PBS, which combines it with the optical data signal PSnx to form a polarization multiplex signal PMSn. The POLMUX signal PMSn emitted at the output of the polarization combiner is supplied to a beam splitter ST2, whose first output leads to the transmission link, while a measurement signal is routed to the regulating facility RE by way of the second output. The polarization state of the resultant for the POLMUX signal is measured there and a monitoring signal KS is generated, which is supplied to the phase modulator PMOD. This allows the phase shift between the optical signals PSnx and PSny to be set exactly.

To realize the inventive method, the specified variant of a POLMUX transmit arrangement is implemented for example for all even-number channels of the WDM system. The carrier phase of the modulated data signal PSny at the phase modulator is then kept to 0° in the odd-number channels. The POLMUX signals of the even-number and odd-number channels are combined for data transmission with polarization-maintaining arrayed waveguide gratings (AWG).

The polarization and phase of the two optical signals of a POLMUX signal can optionally also be set before data modulation. To this end the carrier signal TS is split into two carrier signals TSnx and TSny of the same amplitude and with mutually orthogonal polarization using a polarization splitter PBS. These carrier signals are supplied to respectively different modulators. The phase is subsequently set behind one of the modulators.

Figure 8:
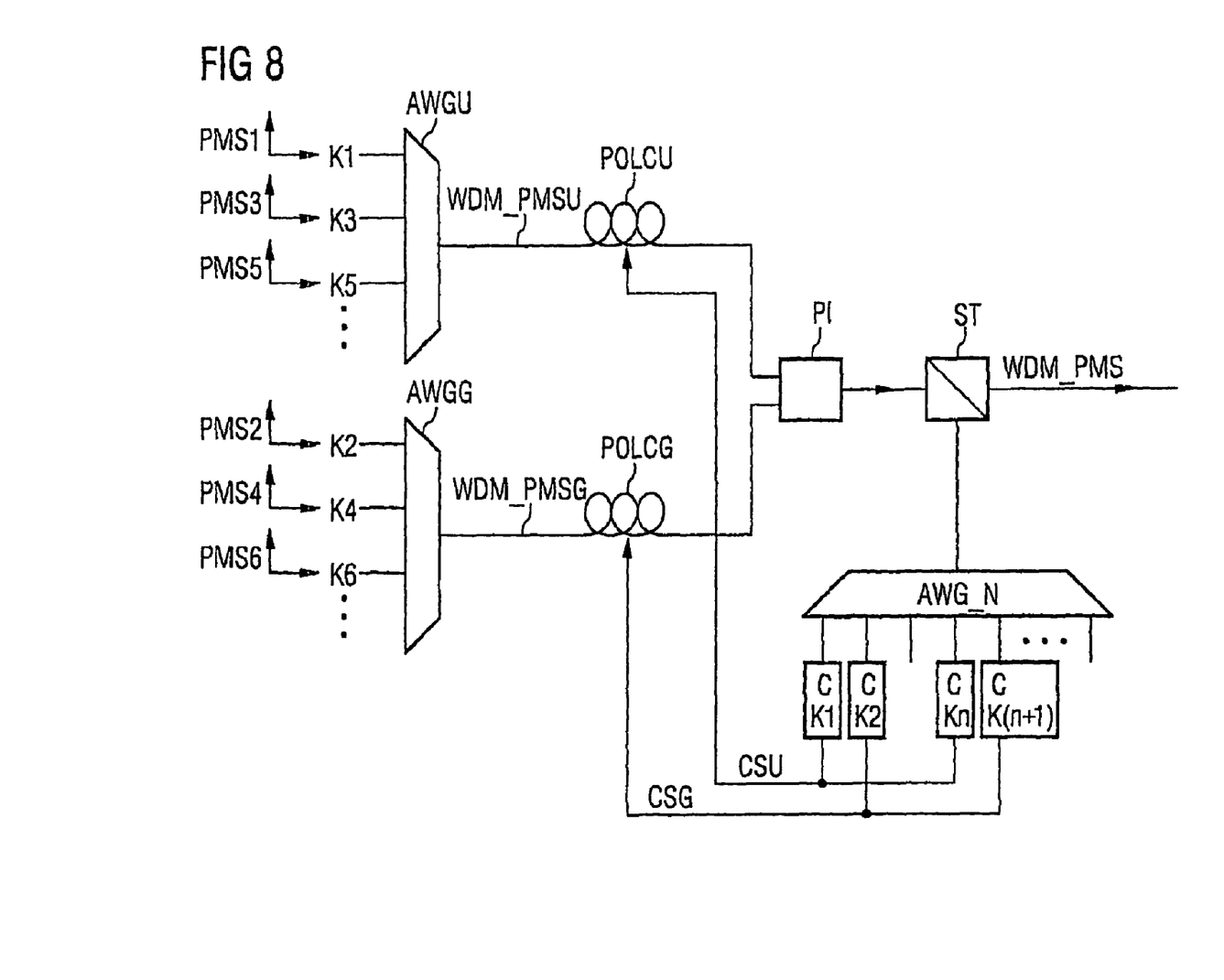
FIG. 8 shows the basic circuit diagram of a first variant of a POLMUX transmit arrangement.

FIG. 8 shows the basic circuit diagram of a variant of a POLMUX multiplexer for realizing the inventive method. The POLMUX signals PSM1, PMS3, PMS5, ... of the odd-number channels K1, K3, K5, ..., which respectively consist of two mutually orthogonal data signals PSix and PSiy, where i is an odd number, are supplied to the inputs of a polarization-maintaining AWG AWGU, where they are combined to form a first WDM signal WDM_PMSU. Let the channel spacing of the individual channels in this example be 100 GHz. The output of AWGU is connected by way of a polarization-maintaining fiber and a polarization control element POLCU to the first input of a channel interleaver PI. The POLMUX signals PMS2, PMS4, PMS6, ... of the even-number channels K2, K4, K6, ... differ compared with the POLMUX signals of the odd-number channels in that the carrier signal of one of the two data signals with mutual orthogonal polarization is phase-shifted through 180° in respect of the other. The POLMUX signals PMS2, PMS4, PMS6, ... are supplied to the inputs of a polarization-maintaining AWG AWGG, where they are combined to form a second WDM signal WDM_PMSG. Let the channel spacing of the individual channels here be 100 GHz. The output of AWGG is connected by way of a polarization-maintaining fiber and a polarization control element POLCG to the second input of a channel interleaver PI. The WDM POLMUX signal WDM_PMS, which consists of N POLMUX signals with mutually interleaved polarizations, is emitted at the output of the channel interleaver PI. The channel spacing is now 50 GHz. The WDM POLMUX signal WDM_PMS is split into two sub-signals at a beam splitter ST. The first sub-signal is supplied to the transmission link, while the second sub-signal is supplied to a polarization-maintaining AWG AWG_N, which functions as a demultiplexer. At the output of the demultiplexer AWG_N the POLMUX signals can be supplied channel by channel to polarization monitoring facilities C(Kn), where n=1 ... N, in which the polarization state of a POLMUX signal is determined as required. The polarization monitoring facilities C(Kn) of the even-number and respectively odd-number channels are connected to the respective polarization control elements POLCG and POLCU. The polarization state of the WDM signals WDM_PMSG and WDM_PMSU are checked and regulated by means of the monitoring signals CSG and CSU.

Figure 9:
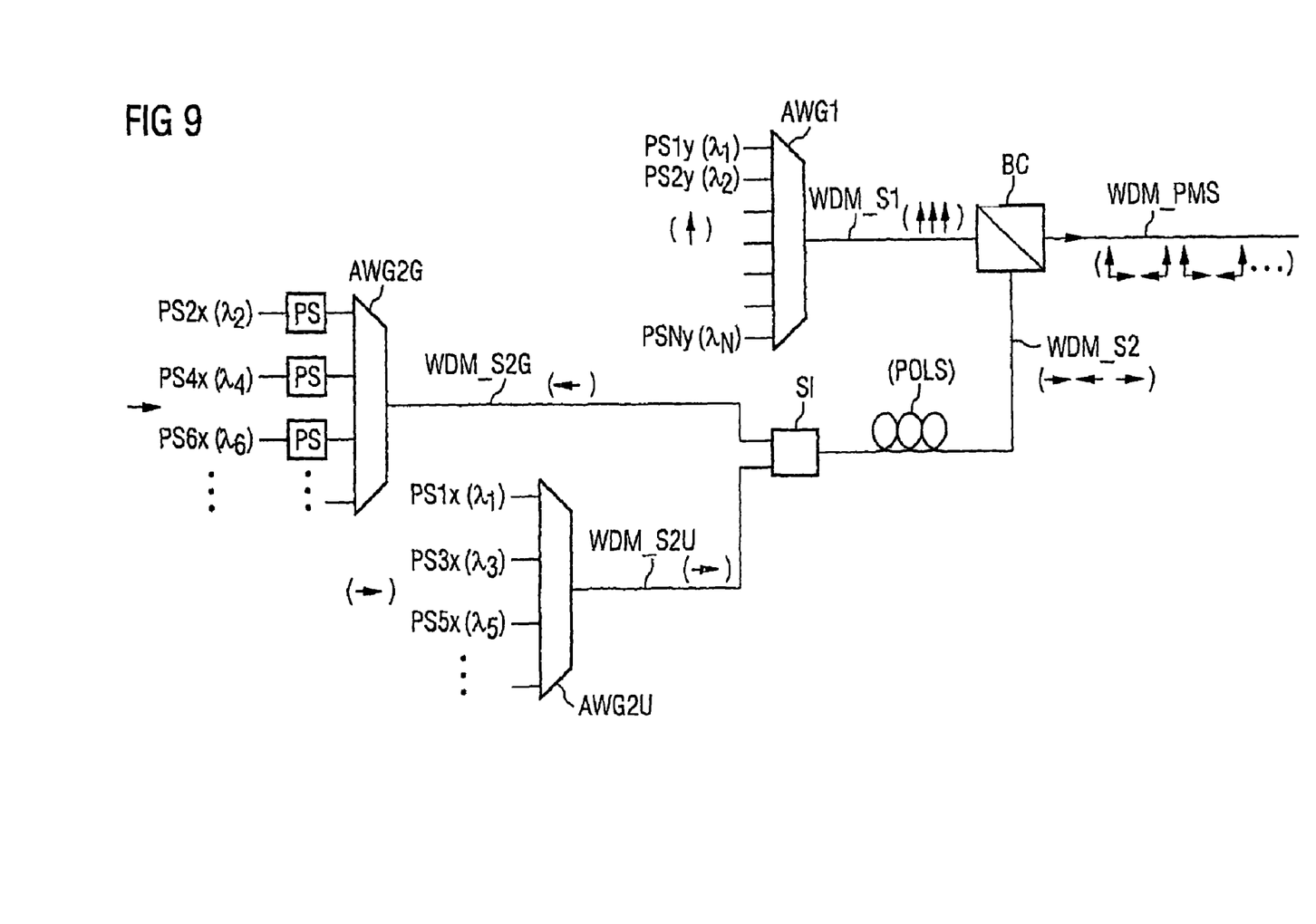
FIG. 9 shows the basic circuit diagram of a second variant of a POLMUX transmit arrangement.

FIG. 9 shows the basic circuit diagram of a second variant of a POLMUX transmit arrangement for realizing the inventive method. A first WDM signal WDM_S1, made up of modulated optical data signals PS1y($\lambda_1$), PS2y($\lambda_2$), ..., PSNy($\lambda_N$) with a channel spacing of 50 GHz, is supplied to a first input of a beam combiner BC. The modulated optical data signals PS2x($\lambda_2$), PS4x($\lambda_4$), PS6x($\lambda_6$) ... of the even-number channels (the channel spacing is 100 GHz for example) are supplied by way of phase setters PS to a multiplexer AWG2G, which preferably consists of a polarization-maintaining AWG. The phase of the optical signals is shifted in each instance through 180° in the phase setters. (In the drawing the polarization states of the respective signals are given in brackets as E-field vectors.) The signal WDM_S2G combined in the multiplexer AWG2G is then supplied to a signal interleaver SI. The modulated optical data signals PS1x ($\lambda_1$), PS3x($\lambda_3$), PS5x($\lambda_5$), ... of the odd-number channels (the channel spacing is 100 GHz) are supplied directly without phase shift to a polarization-maintaining multiplexer AWG2G, where they are combined to form a sub-signal WDM_S2U and emitted to the output. The first sub-signal WDM_S2U is supplied to the signal interleaver SI. This can be a periodic filter with a 50 GHz period (a 50 GHz interleaver) for example. In the 50 GHz interleaver SI the two WDM sub-signals WDM_S2U and WDM_S2G are combined to form a second WDM signal WDM_S2 with 50 GHz channel spacing. The second WDM signal WDMS_S2 is supplied by way of a polarization adjuster POLS to a first input of a beam combiner POLS. The polarization adjuster POLS brings about a polarization rotation of the WDM signals WDM_S2 through 90°. All the individual signals of WDM_S1 have a polarization that is orthogonal in respect of the signals of WDM_S2. In the beam combiner BC the WDM signals WDM_S1 and WDM_S2, which are polarized in a mutually orthogonal manner, are combined and emitted to the output. The polarization planes are naturally interchangeable. Similarly the pole setter can be dispensed with, if the second data signals PSny are fed in orthogonally in respect of the first data signals PSnx, as shown in FIG. 9.

The WDM output signal WDM_PMS thus generated therefore consists per channel of a POLMUX signal PMS, in which two modulated optical signals are polarized orthogonally in respect of each other. The resulting polarization of the POLMUX signals in the even-number channels thereby differs by 90° in respect of the odd-number channels. This transmit arrangement can be realized with less outlay than the variant shown in FIG. 8.

The invention claimed is:

1. A method for the optical transmission of polarization multiplex signals of different wavelength combined to form a wavelength division multiplex signal, comprising:

forming a first polarization multiplex signal in a first channel with a first wavelength by combining two orthogonally polarized amplitude-modulated optical data signals without a phase difference between their carrier signals; and forming a second polarization multiplex signal in a second channel with a second wavelength by combining two orthogonally polarized amplitude-modulated optical data signals whose carrier signals are phase-shifted through 180° in respect of each other, such that when the two orthogonally polarized amplitude-modulated optical data signals whose carrier signals are phase-shifted through 180° in respect of each other respectively are transmitted simultaneously, a resulting polarization of the second polarization multiplex signal differs by 90° from the resulting polarization of the first polarization multiplex signal, wherein the optical data signals of odd-number channels without a phase difference between their carrier signals are combined to form first polarization multiplex signals, and in the even-number channels, carrier signals respectively of first optical data signals that are phase-shifted through 180° in respect of carrier signals of second optical data signals are combined to form second polarization multiplex signals, wherein the second optical data signals of all channels having the same polarization are combined to form a first WDM signal and supplied to a first input of a polarization combiner, wherein the first optical data signals of the odd-number channels having the same polarization are combined to form a first WDM sub-signal, wherein the first optical data signals of the even-number channels with their phases adjusted through 180° and having the same polarization are combined to form a second WDM sub-signal, with the polarization of the second optical data signals differing by 90° in respect of the polarization of the first optical data signals or being set in such a manner, and wherein both WDM sub-signals combined to form a second WDM signal are then supplied to a second input of a polarization combiner, and this emits a WDM output signal WDM PMS having the polarization multiplex signals with which the resulting polarization between adjacent polarization multiplex signals differs by 90°.

2. The method as claimed in claim 1, wherein the polarization of the resultants for the polarization multiplex signals is monitored and regulated at least once during the data transmission.

3. The method as claimed in claim 1, wherein polarization states and phases of the carrier signals are set or regulated before modulation of the optical signals of a polarization multiplex signal.

4. The method as claimed in claim 1, wherein to achieve a criterion of phase regulation, a polarization state of the resultant for a polarization multiplex signal is measured and a regulating signal is derived therefrom.

5. The method as claimed in claim 1, wherein the phase difference between the carrier signals of the optical data signals of a channel is regulated.

6. The method as claimed in claim 1, wherein to achieve a criterion of phase regulation, a polarization state of the resultant for a polarization multiplex signal is measured and a regulating signal is derived therefrom.

7. The method as claimed in claim 1, wherein polarization states and phases of the carrier signals are set or regulated before modulation of the optical signals of a polarization multiplex signal.

8. The method as claimed in claim 1, wherein the polarization of the resultants for the polarization multiplex signals is monitored and regulated at least once during the data transmission.

* * * * *